United States Patent
Lentz et al.

[11] Patent Number: 6,164,665
[45] Date of Patent: *Dec. 26, 2000

[54] VEHICLE SUSPENSION SYSTEM WITH CONTINUOUSLY ADAPTIVE SHOCK ABSORPTION

[75] Inventors: Uwe Lentz, Neustadt; Jörg Meier, Hess. Oldendorf, both of Germany

[73] Assignee: WABCO GmbH, Hannover, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/962,791

[22] Filed: Nov. 3, 1997

[30] Foreign Application Priority Data

Nov. 21, 1996 [DE] Germany .................. 196 48 176

[51] Int. Cl.$^7$ .................................................. B60G 17/00
[52] U.S. Cl. ............................... 280/5.503; 280/124.157
[58] Field of Search ................................ 280/5.5, 5.503, 280/5.517, 5.518, 6.154, 6.155, 124.157; 180/89.12

[56] References Cited

U.S. PATENT DOCUMENTS

| | | | |
|---|---|---|---|
| 5,242,190 | 9/1993 | Morris | 280/5.503 |
| 5,346,246 | 9/1994 | Lander et al. | 280/124.157 |
| 5,484,162 | 1/1996 | Kanoh et al. | 280/6.157 |
| 5,697,635 | 12/1997 | Koster et al. | 280/124.157 |
| 5,725,239 | 3/1998 | De Molina | 280/5.503 |

FOREIGN PATENT DOCUMENTS

| | | |
|---|---|---|
| 0 262 572 | 4/1988 | European Pat. Off. . |
| 3705508 | 8/1987 | Germany . |
| 3937841 | 5/1990 | Germany . |
| 41 05 937 | 8/1992 | Germany . |
| 42 43 979 | 7/1993 | Germany . |
| 4243979 | 7/1993 | Germany . |
| 44 47 039 | 6/1995 | Germany . |
| 44 60 364 | 2/1996 | Germany . |

OTHER PUBLICATIONS

Wabco Brochure No. 826 001 1743, entitled "ESAC—Electronic Shock Absorber Control" (1994).

K.H. Schönfeld, "Electronically Controlled Air Suspension (ECAS) For Commercial Vehicles," *Commercial Vehicle Suspensions, Steering Systems, and Traction*, SP–892, No. 912671, Nov. 1991, pp. 15–24.

*Primary Examiner*—J. J. Swann
*Assistant Examiner*—Michael Cuff
*Attorney, Agent, or Firm*—Proskauer Rose LLP

[57] ABSTRACT

A vehicle suspension system that varies its shock absorption maximize comfort when compatible with safe handling. Level sensors are positioned to determine the position and attitude of the body of the vehicle in relation to its axles. An electronic regulator controls adjustable air springs to maintain the desired position and orientation of the body. Each air spring can be filled from a compressed-air supply to raise the body, and the system can also bleed air off to lower the body. The electronic regulator also accepts a signal from a double-differentiation device that is connected to the output of one of the level sensors. This signal is a measure of the acceleration of the body, and it is used to compute a bad-road parameter. The bad-road parameter also depends on the change in acceleration that occurs between successive measurements. The electronic regulator calculates a body-shock absorption requirement from the outputs of the level sensors and then uses the bad-road parameter to compute the total shock absorption required from the variable shock absorbers. On a bad road, when the body shock absorption is low, the total shock absorption is increased to provide better handling. When the body shock-absorption requirement is medium, the total shock absorption is lowered on a bad road to increase comfort or safety of loaded goods. When the body shock-absorption requirement is high, safe handling takes precedence over comfort on a bad road, but the total shock absorption may need to be lowered to avoid damaging the suspension system.

7 Claims, 5 Drawing Sheets

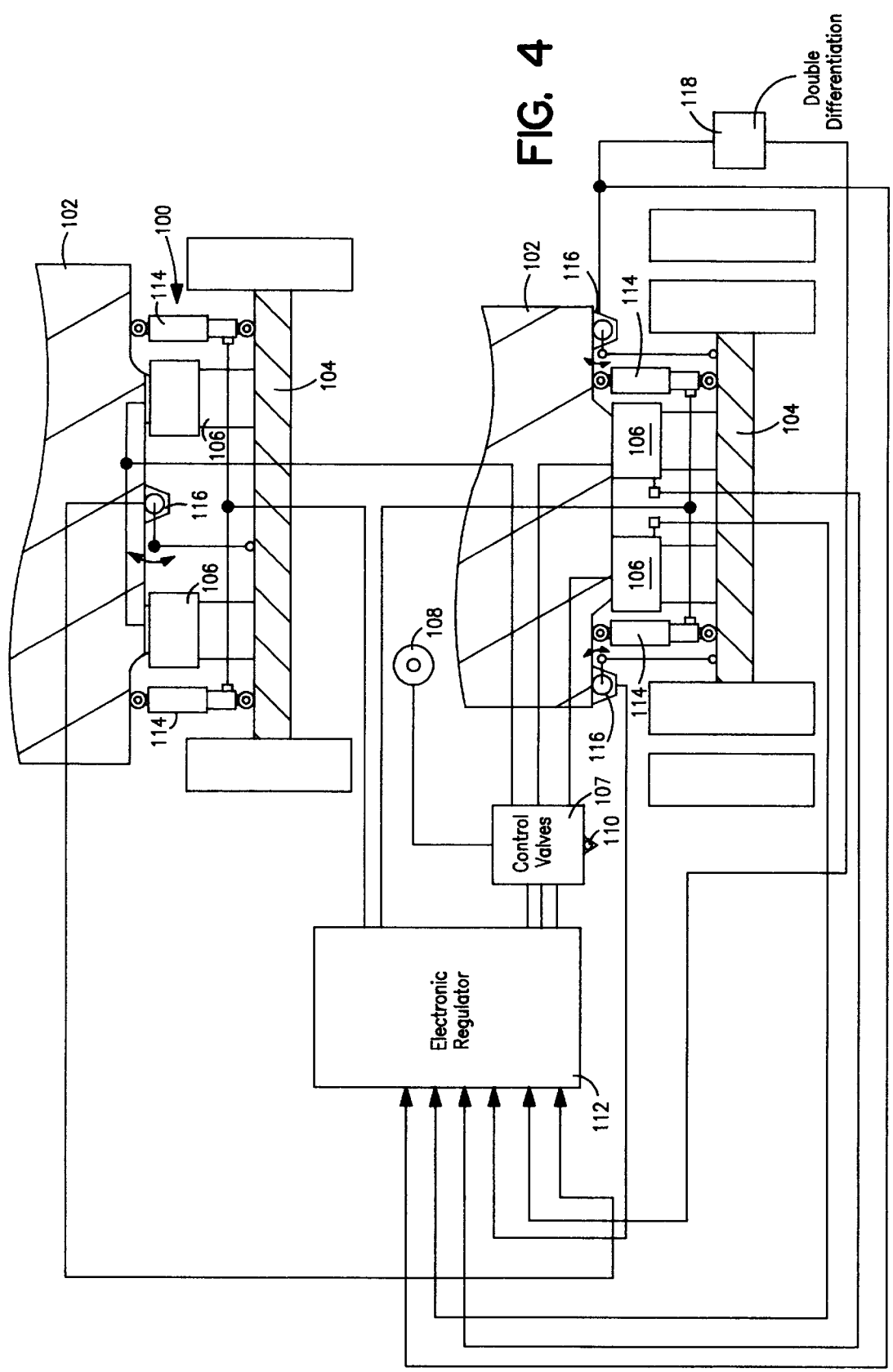

VEHICLE SUSPENSION SYSTEM WITH CONTINUOUSLY ADAPTIVE SHOCK ABSORPTION

BACKGROUND OF THE INVENTION

A prior-art vehicle suspension system that absorbs shocks adaptively in response to changing conditions is known, for example, from "ESAC—Electronically Controlled Traveling Gear Shock Absorption," which is WABCO Publication 826 001 173 3/8.94 published by WABCO Westinghouse Vehicle Brakes, WABCO Standard GmbH.

The prior-art ESAC suspension system selects a shock-absorption characteristic (soft, medium, or hard) that is most suitable for the current driving condition. In undisturbed travel, for example, the system provides soft, purely comfort-oriented shock absorption. If the vehicle should veer in response to a sudden steering action, on the other hand, the system switches to harder, and therefore safer, shock absorption. Shock absorption also hardens when unevenness in the road surface causes excessive deflections in the suspension system. Adaptive variation of shock absorption is also especially helpful in reducing pitching motions in vehicles that have a short wheel base. During acceleration, the front-end of the bodies of such vehicles otherwise tend to rise up excessively while transferring weight onto the rear axle. During braking, the opposite motion occurs as the rear of the body rises and weight is transferred to the front axle.

The prior-art ESAC suspension system recognizes deflections in the suspension at three points. One sensor detects an average spring excursion at the front axle and two more sensors are placed at the left and right rear springs. These three points are sufficient to determine the plane of the body of the vehicle. The three spring excursions also determine what is called a body shock-absorption requirement.

As mentioned above, the shock absorbers are hardened in case of excessive motions of the body of the vehicle. In other words, the degree of uncoupling is reduced between the axles and body of the vehicle. In this condition, shocks pass from the axles through the suspension to the body with less filtering causing a reduction in comfort. Comfort is especially strongly impacted by small irregularities in the road surface when the suspension system has hardened in response to more gradual but larger hollows or mounds in the roadway.

It is therefore an object of the present invention to provide an improved adaptive suspension system that provides greater comfort, when possible, while maximizing travel safety even on poor roads.

It is another object of the present invention to improve the treatment of loaded goods in vehicles traveling on poor roads. Yet another object is to reduce the load on the shock-absorbers themselves as well as on their controls. A further object of the invention is to provide a software implementation that does not require costly additional hardware components.

It is another object of the present invention is to use a bad-road parameter that takes various effects into account without determining them in unnecessary and costly detail. Among these effects are under-damped axle oscillations. In principle, these oscillations could be determined from the high-frequency components of the output signals of sensors that measure deflection at the springs or piston speed at the shock absorbers. In practice, however, these high-frequency components are removed by filtering, and the effect of the under-damped axle oscillations is lost.

It is another object of the present invention to provide the maximum comfort compatible with travel safety by employing shock absorbers with continuously variable shock-absorption force.

It is also an object of the present invention to provide harder shock absorption on poor roads, even when the vehicle body does not experience excessive vertical motions. For example, short-wave unevenness in the road does not cause shock-absorber hardening in the prior-art system. By hardening the shock absorption in such cases, the present invention avoids an under-damped motion called "axle trampling," which is also a significant cause of road wear. Fluctuations in wheel load are also reduced, which improves the steering and propulsion characteristics of the tires, thereby further ensuring travel safety.

SUMMARY OF THE INVENTION

In accordance with the present invention, a vehicle suspension system adapts to varying conditions to provide as much comfort for persons riding in the body of the vehicle as is compatible with safe handling. The body is supported by the suspension system, which in turn is supported by axles on which wheels are mounted that travel on a roadway. The major components of the system are air springs, also referred to as air bags or bellows, variable shock absorbers, and additional components that adjust the springs and control the shock absorbers. In particular, the system includes sensors that determine the distances between the axle and body at each spring and level adjustments that can increase or decrease these distances.

The system also includes an electronic regulator that samples the sensors and controls the level adjustments in order to maintain the distance at each spring at predetermined desired values. The electronic regulator receives a signal that represents the acceleration of the body with respect to a point on one of the axles from a double-differentiation device. The input of the double-differentiation device is connected to the output of one of the level sensors. The electronic regulator uses the outputs of the level sensors and of the double-differentiation device in setting the shock absorbers to the optimized absorption for the prevailing conditions.

The electronic regulator uses the distances determined by the sensors to determine a body shock-absorption requirement. Higher frequencies corresponding to wheel motions that do not affect the body are filtered out of the sensor signals for the determination of the body shock-absorption requirement. The body motions that must be actively controlled are roll, where the vehicle rises on one side and transfers weight to the other side, and pitch, where one end of the vehicle rises and transfers weight to the other end. The body shock-absorption requirement is expressed as a percentage of a maximum shock absorption, and it is determined by combinations of values of roll and pitch organized as a matrix of cases.

The electronic regulator also computes a bad-road parameter and uses it to modify the body shock-absorption requirement. The result is called the total shock-absorption requirement, which can be either higher or lower than the body shock-absorption requirement. Now, it is technically difficult and costly to determine the forces or the piston speeds at the shock absorbers directly. Therefore, the bad-road parameter is computed instead as a weighted sliding average of the acceleration of the body of the vehicle for a fixed period of time. This acceleration is adequately represented by the output of a double-differentiation device that receives its input from one of the level sensors. Typically, the sensor at the rear wheel traveling at the near side of the road is used. The acceleration of the body at this point is obtained periodically and converted into counts.

The bad-road parameter is calculated from a weighted sliding average of absolute magnitudes of body acceleration. The sliding average is performed over a fixed number of successive measurements of body acceleration ending with the most recent measurement. The weights are either 0 or 1, so the values that are used in the sum can be called selected values. Accelerations are selected if they are larger in magnitude than a certain insensitivity band and if they have changed by more than a certain amount from the previous measurement. The bad-road parameter at each time is then expressed as a percentage of the maximum possible sum. Because small accelerations do not contribute to the bad-road parameter, the calculation provides an effect that is equivalent to a type of high-pass filter.

An example of a bad road would be one containing potholes. The inventive system responds to such short-wave unevenness differently in different ranges of body shock-absorption requirement. For example, when the body shock-absorption requirement is low, a severe oscillation known as "axle trampling" may occur on a bad road. Because it is considered dangerous to allow the axles to trample, a higher value of total shock-absorption requirement is calculated even though this reduces comfort to some extent.

In a medium range of body shock-absorption requirement, the vehicle body undergoes substantial motions even on a smooth road. It is therefore necessary to reduce the total shock-absorption requirement on a bad road. Otherwise, strong jolts could be felt as the hardened shock absorbers damp the short-wave motions that are characteristic of a bad road. In addition to causing discomfort, such jolts stress the shock absorbers and can even damage goods that are loaded on the vehicle.

At high levels of body shock-absorption requirement, safety takes precedence over comfort. This means that the body shock-absorption requirement is not necessarily reduced in computing the total shock-absorption requirement for a vehicle traveling on a bad road. Doing so could increase the body motions enough to damage the vehicle structurally. Such damage must be avoided because it is not possible to guarantee that the vehicle can be controlled once damage has occurred. On the other hand, some reduction of the total shock-absorption requirement may be necessary because a high total shock-absorption requirement could produce shock-absorption forces large enough to damage the shock absorbers or their couplings. This second type of change in body shock-absorption requirement increases both safety and comfort, although the vehicle body will oscillate with larger amplitude.

The organization and operation of this invention will be understood from a consideration of detailed descriptions of illustrative embodiments, which follow, when taken in conjunction with the accompanying drawings.

BRIEF DESCRIPTION OF THE DRAWINGS

FIG. 4 is a schematic illustration of the inventive suspension system.

DETAILED DESCRIPTION OF THE INVENTION

Figure 1:
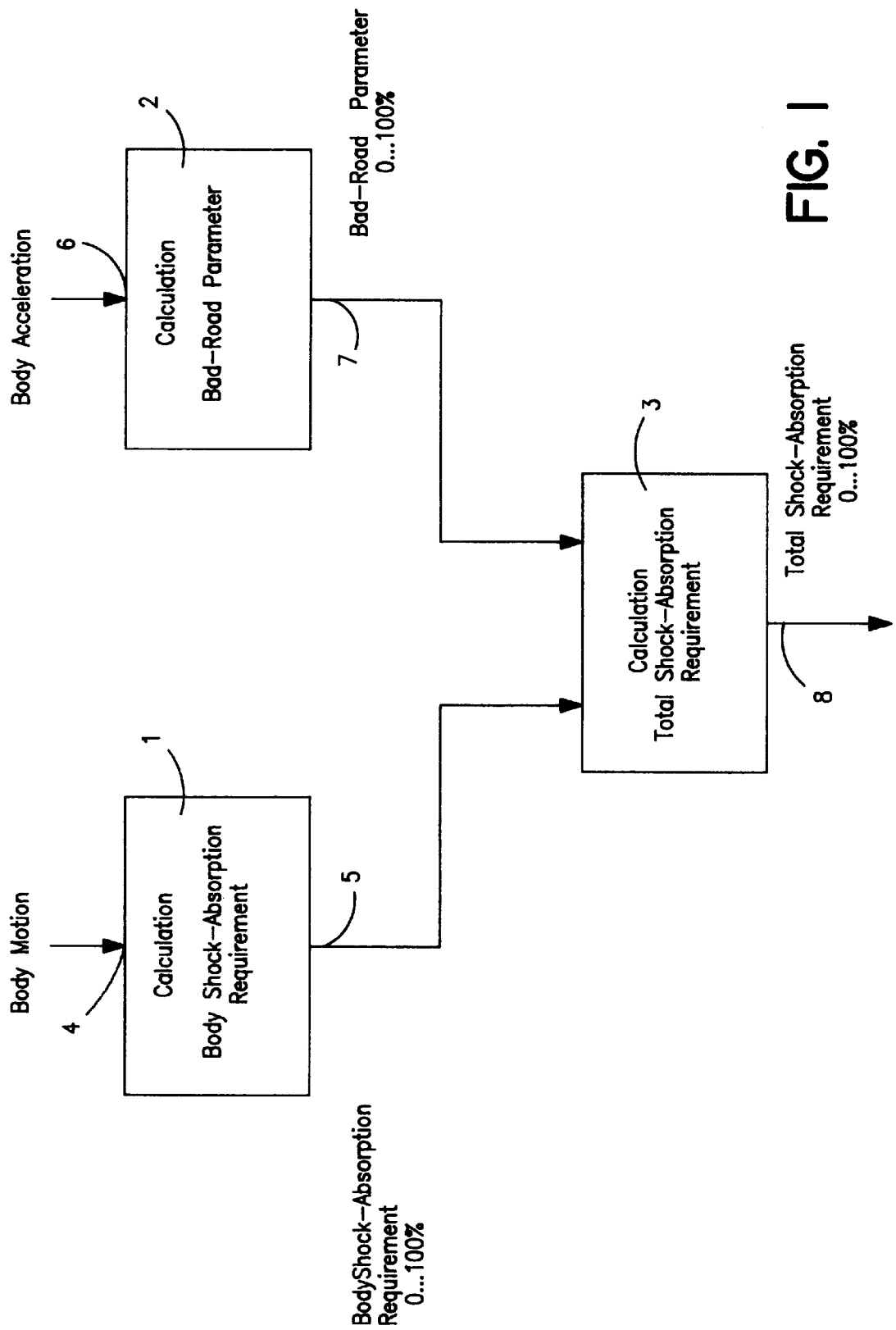
FIG. 1 is a block diagram of steps that the inventive suspension system performs to determine a total shock-absorption requirement from a body shock-absorption requirement and a bad-road parameter, FIG. 2 explains the calculation of the bad-road parameter in FIG. 1 from a sliding weighted average of accelerations of the springs of the inventive suspension system.

Referring to FIG. 4, the inventive suspension system 100 relates to an air-cushioned vehicle with a body 102 that is supported on axles 104 by air bags or bellows (also referred to as air springs) 106. The quantity of air in each air bag determines the height of the body where it connects to the air bag with respect to the point where the air bag connects to one of the axles.

The air-cushioned vehicle is furthermore equipped with electronic level adjustment. These adjustments are performed by control valves 107 that are installed on the air bags. Each control valve changes the quantity of air in its air bag in response to an electrical adjusting signal from an electronic regulator 112. There are two valves at each air bag. One of these valves allows compressed air to enter the air bag from a compressed-air storage tank 108, and the other valve bleeds air from the air bag to a sink 110. Level sensors 116 are provided that find the actual distances between the vehicle body and the vehicle axles. The electronic regulator 112 compares the actual distances, which are transmitted from the level sensors 116, with desired distances stored in the regulator.

The electronic regulator begins to change the amount of air in the appropriate air bag when the sensed distance deviates from the desired distance. The regulator continues to fill the bag, or bleed air out of it, until the actual distance becomes equal to the distance desired at that air bag. The electronic regulator carries out this level regulation for all of the different air bags in a multiplexed fashion. For example, the electronic regulator may be a digital regulator with a fixed scanning time. In this case, each level sensor is sampled in succession, and a given level sensor is sampled periodically at a frequency equal to the inverse of the scanning time. The distance that a particular level sensor last transmitted to the electronic regulator is compared with the corresponding desired distance while the other sensors are being sampled.

In an embodiment of the invention for a vehicle with two axles, four air bags would be used. They are placed on the right and left sides of both axles near the wheels. (Alternatively, a pair of air bags may be used on each side of the rear axle. Such a pair of physical bags will be treated as one logical air bag for the purpose of this discussion.) Because the reference plane of the vehicle body is defined by three points, three level sensors provide sufficient data for the adjustment of all four air bags. For example, two of these sensors may be located on the rear axle near the left and right wheels, and the third sensor may be located approximately at the center of the front axle.

Electrically controlled shock absorbers 114 that can be set to values in a continuous range of absorbing force are also provided. For example, an individual shock absorber may be placed near each air bag. One end of each shock absorber is connected to the body, and the other end is connected to one of the axles. For a two-axle vehicle, there are a total of four shock absorbers located at the left and right sides of the front and back axles.

The inventive suspension system absorbs two types of motions that may otherwise be transmitted to the body. A wheel shock-absorption requirement arises from high-frequency motions of the wheels. The suspension system is most prone to transmit these motions to the body when the shock absorbers are hardened. A separate body shock-absorption requirement arises from comparatively low-frequency motions of the body. In fact, the body shock-absorption requirement depends only on the position of the body relative to the axles. This position is determined by sensors that measure the excursion of each spring from its neutral position.

These spring excursions are changes in the actual distances between points on the body and corresponding points on the axles. They are therefore simply related to the distances measured by the three level sensors. Thus the outputs of the level sensors serve a second purpose by determining the presence of body motions that must be opposed by the shock absorbers.

The sampled values of the level sensors are passed through a suitable low-pass filter before further processing. This reduces random fluctuations of the measured values from sample to sample that otherwise might interfere with the level regulation. Low-pass filtering also eliminates wheel oscillations so that body motions can be determined. Based on the filtered measured values of the level sensors, i.e. the filtered actual distances, "rolling" and "pitching" motions of the vehicle body are determined in a known manner. For example, the roll angle can be determined from the difference between the outputs of the level sensors at the left and right sides at the rear axle. The pitching angle is based on the difference between the mean distances supplied by the sensors at the front axle and the sensors of the rear axle.

In determining a shock-absorption requirement, the amplitude as well as the frequency of the oscillations to be attenuated play a role. Low-frequency oscillations have priority because they affect both travel stability and riding comfort. The low-frequency body motions that require attenuation are actually determined by the angles and frequencies of rolling and pitching.

FIG. 1 shows three calculation steps needed to determine the total shock-absorption requirement. A first block (1) calculates the shock-absorption requirement for the body of the vehicle (body shock-absorption requirement), and a second block (2) calculates a bad-road parameter. These results are combined in a third block (3) to produce the total shock-absorption requirement. The body motions explained above are transmitted to the input (4) of the first block (1). The first block (1) produces the body shock-absorption requirement as a percentage of a fixed maximum value at an output (5). The input value (6) of the second block (2) consists of a body acceleration (6) that is explained below. The second block (2) produces the bad-road parameter as a percentage of another fixed maximum value at an output (7).

The body shock-absorption requirement and the bad-road parameter are presented as inputs to the third block (3). The total shock-absorption requirement is then determined as a percentage of yet another fixed maximum value at an output (8) of the third block (3).

The determination of the body requirement for shock absorption according to the first block (1) is known. The body motions are evaluated by sorting rolling and pitching into classes by magnitude and forming a matrix of cases. In each case, the combined effects of rolling and pitching are taken into account appropriately. For example, a high level of shock absorption is required by a high magnitude of roll by itself. In such a case, therefore, an additional medium pitching magnitude has practically no effect on the body shock absorption.

The calculated body shock-absorption requirement, from 0 to 100%, represents the hardening of the shock absorption. No shock-absorption hardening is indicated by a value of 0%, and 100% corresponds to the maximum force of shock absorption. In the prior art, this value alone is used by an electronic regulator to control the shock absorbers in the vehicle.

The calculations performed in the second block (2) in FIG. 1 are based on the acceleration of the body with respect to the axles. As shown, this acceleration is provided at an input (6). The acceleration occurs as changes in the spring excursions are reflected at the outputs of the level sensors. The acceleration of the body is linearly related to the second derivatives with respect to time of the filtered values of the level sensors.

In order to determine the body acceleration exactly, the filtered outputs of all three level sensors should actually be used. Their second time derivatives correspond to accelerations of the body at three points with respect to corresponding points on the axles. These three accelerations, in turn, determine a total acceleration value that is valid for the vehicle body as a whole, and this value can be found in an appropriate manner. In practice however, this relatively expensive approach is not necessary. It suffices to estimate the acceleration of the body using the output of only one of the three level sensors. Any of the three sensors would serve, but road unevenness is generally amplified near the side of the road. For these reasons, the output of the level sensor at the right side of the rear axle is connected to the input of a double-differentiation device 118. The acceleration of the body is thus approximated by the acceleration at the right side of the rear axle, which is given at an output of the double-differentiation device.

Figure 2:
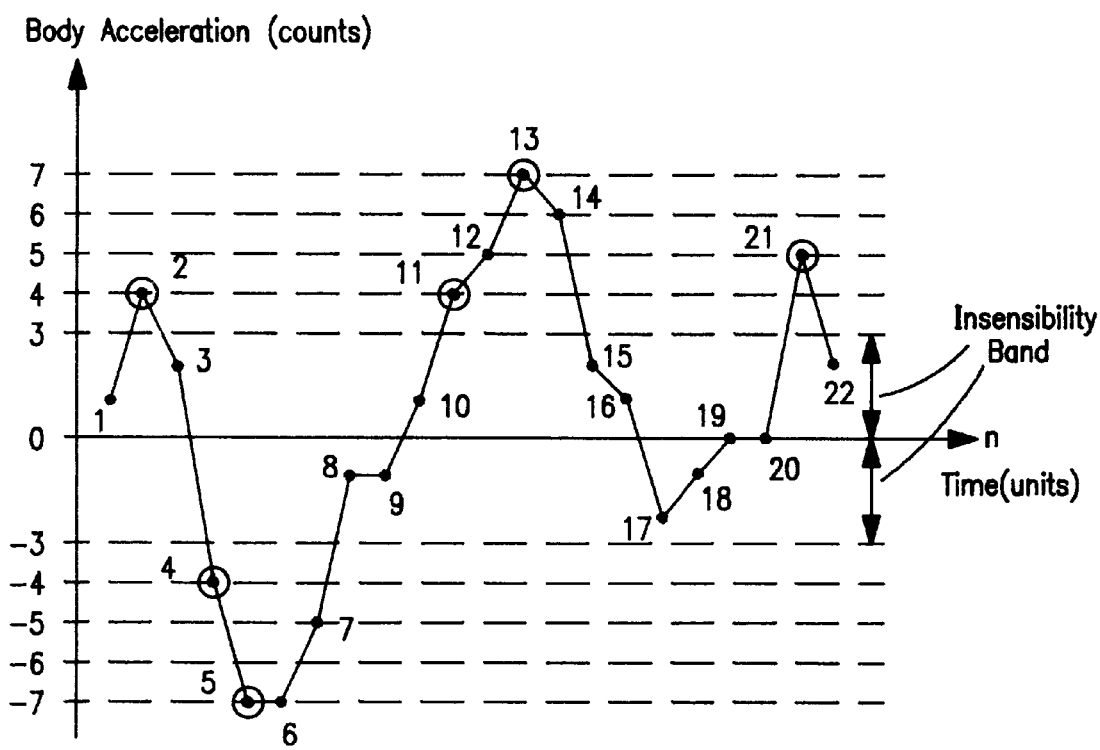

As mentioned earlier, the bad-road parameter is determined from a sliding weighted average of the body acceleration. The body acceleration itself is estimated through double differentiation of the actual distance measured by the level sensor at the right-rear wheel. According to the sampling principle, a value of the body acceleration is obtained at every sampling moment. This acceleration value is indicated in the form of "counts," i.e. processor counting units in the electronic regulator. FIG. 2 shows, as an example, a time diagram where the body acceleration is entered on the ordinate in terms of counts. The abscissa is the time axis, and time is represented in units of the sampling time by a dimensionless number n. For the sake of clarity, the body acceleration values at different times are associated with different values of n [for the sampling moments]. The example is based on a sampling frequency of 40 Hz, so the time difference between one sampling moment and the next sampling is 25 ms.

To determine the bad-road parameter, body-acceleration values are selected according to a first criterion. According to this criterion, accelerations of absolute magnitude less than or equal to a predetermined minimum receive no weight. In FIG. 2, for example, the minimum acceleration has been set at 3 counts. All positive body accelerations of more than 3 counts and all negative body accelerations of less than −3 counts are used, and all accelerations in the insensibility band between these two values are discarded.

According to a second selection criterion, body-acceleration values are only used when they differ from the previously sampled value by at least a fixed difference in acceleration. In the example of FIG. 2, body accelerations are discarded when they have not changed from the previous value by at least 3 counts.

In the time diagram of FIG. 2, the two criteria for including the body acceleration are met at the times corresponding to n=2, 4, 5, 11, 13, 21. The points for these measured values are encircled in the time diagram to direct attention to them.

The magnitudes of the body accelerations satisfying both selection criteria are added together over a time window of a fixed number of sampling points. The bad-road parameter is then determined from this sum. In the example of FIG. 2, the time interval of the window corresponds to n=20, which means that the window is 20 sampling times long. The time window itself moves or slides to the right by one sampling time for each successive value of body acceleration.

For the sake of clarity, three successive time windows (18, 19, 20) are drawn in FIG. 2. The selected body-acceleration values assigned to these time windows are located in the time diagram above the corresponding time window. The first time window (18) begins at the time corresponding to n=1 and continues to n=20. The second time window (19) runs from n=2 to n=21, and the third time window (20) runs from n=3 to 22. To calculate the bad-road parameter for a given time window, the magnitudes of the body accelerations meeting the two criteria within that window are added up. For the first time window (18) this sum is 26, in the second time window (19) it has increased to 31, and for third time window (20) it has fallen back to 27. The bad-road parameter for a particular time window is then found by normalizing its sum value and expressing it as a percentage. Suppose the sum can be in the range from 0 to 255 and is represented by an 8-bit binary number. Then in the examples of FIG. 2, the bad-road parameters are:

100*26/255=10.2% for the first time window (18),
100*31/255=12.2% for the second time window (19), and
100*27/255=10.6% for third time window (20).

The time diagram of FIG. 2 thus shows an example for a good road condition.

Level sensors with resolution necessary for these calculations and for the other purpose of level regulation are both inexpensive and very robust.

A bad road is one having mainly short-wave unevenness caused, for example, by the presence of potholes. They can cause the vehicle body to oscillate up and down. However, the amplitude of this oscillation may be too low for the level regulation to respond effectively. Now, direct detection of these low-amplitude oscillations is possible in principle. It is ruled out in practice, however, because such sensors are expensive and require careful handling. Thus, it is not practical to determine the nature of the road directly from the actual distances measured by the level sensors.

In the inventive suspension system, the bad-road parameter is calculated from the accelerations of the actual distances. Because small changes in acceleration between sampling points do not contribute, long-wave irregularities in the road surface do not affect the result. On the other hand, short-wave components are more strongly weighted by the calculation. Thus the calculation provides an effect that is equivalent to a type of high-pass filter. The shorter the waves and the larger the amplitude, the more acceleration values are selected within a time window. The number of selected acceleration values as well as their magnitudes affects the weighted average in a particular time window and thereby increases the bad-road parameter at that time.

In case of short-wave unevenness of the road surface, high shock-absorber speeds or high shock-absorbing forces occur. It is technically difficult to detect either of these quantities directly, and a detector for this purpose would be very costly to manufacture.

The process explained above and illustrated in FIG. 2 determines a bad-road parameter from the accelerations of the distances measured by the level sensors. This makes it possible to judge the road condition without measuring shock-absorption forces or the speed of the pistons in the shock absorbers.

As FIG. 1 shows, the body shock-absorption requirement present at the output (5) of the first block (1) and the bad-road parameter present at the output (7) of the second block (2) serve as inputs to the third block (3). In the third block (3), the body shock-absorption requirement is modified by the bad-road parameter. The resulting total shock-absorption requirement is provided by the third block (3) at an output (8). Finally, the electronic system regulator uses the total shock-absorption requirement to set the shock absorbers within a continuous range of shock absorption.

The third block (3) in FIG. 1 uses the bad-road parameter to calculate a correction of the body shock-absorption requirement. It would be ideal to use the shock-absorption force to make this correction. As already mentioned, however, a direct detection of the attenuation force or piston speed is not practical. The bad-road parameter is a satisfactory substitute for the shock-absorption force because large forces appear with large bad-road parameters and low forces appear with low bad-road parameters. That is, a large bad-road parameter indicates that the axles are oscillating with high amplitudes at high frequencies, which leads to large shock-absorption force or high piston speed.

Figure 3A:
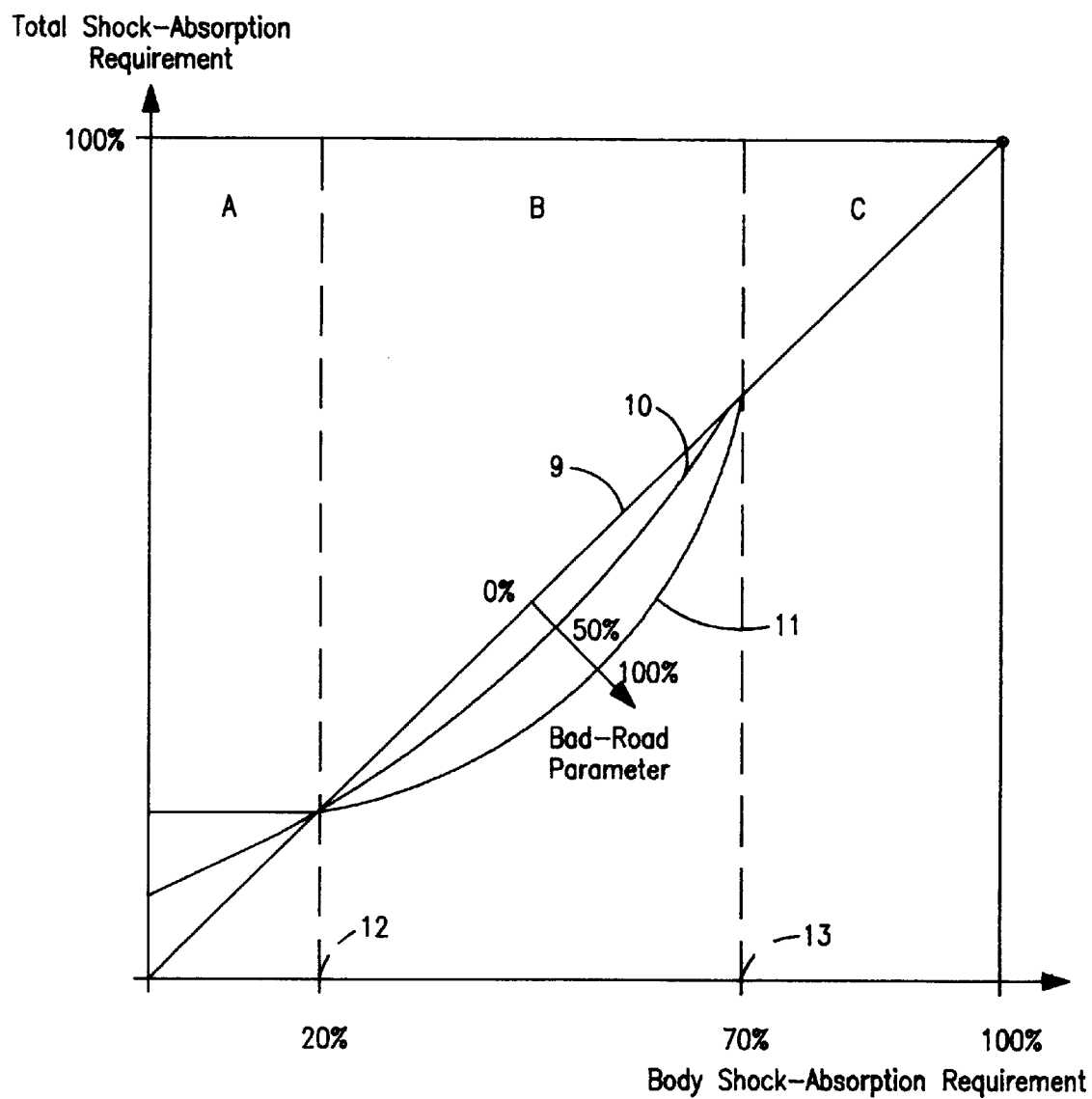
FIG. 3a shows a first type of calculation of the total shock-absorption requirement in FIG. 1 that depends on the bad-road parameter in low and medium ranges of the body shock-absorbtion requirement but not in its high range.

FIG. 3a shows a first type of change of the body shock-absorption requirement for the determination of the total shock-absorption requirement. On the abscissa of FIG. 3a, the body shock-absorption requirement is entered as an independent variable in a range from 0 to 100%. The ordinate shows the calculated total shock-absorption requirement, also within a range of 0 to 100%. Three curves (9, 10, 11) are drawn to show the change of the body shock-absorption requirement depending on the value of the bad-road parameter. The first curve (9) shows that there is no change for a bad-road parameter of 0%. The second curve (10) and the third curve (11) show the changes for a bad-road parameter of 50% and 100%, respectively.

The three curves (9, 10, 11) show an increasing influence upon the body shock-absorption requirement as the bad-road parameter increases. In the first curve (9), the influence is zero. In the second curve (10), a bad-road parameter of 50% has produced a change that is already clear by comparison with the first curve (9). The third curve (11) shows the maximum change for a bad-road parameter of 100%.

The type of change of the body shock-absorption requirement also depends on the magnitude of the body shock-absorption requirement itself. This dependence is accounted for by calculating the change differently in two or more ranges of body shock-absorption requirement. The total shock-absorption requirement can be more finely tuned as the number of ranges increases, but the expense also increases, and consequently a suitable compromise between function and cost must be found. A good compromise is achieved with the three ranges of body shock-absorption requirement selected for FIG. 3a.

For the definition of the ranges, a lower limit value (12) and an upper limit value (13) of body shock-absorption requirement are chosen. A lower range "A" comprises all values of the body shock-absorption requirement smaller than the lower limit value (12). A medium range "B" comprises all values of the body shock-absorption requirement equal to or larger than the lower limit value (12) and smaller than the upper limit value (13). Finally, in the upper range "C" the body shock-absorption requirement is equal to or larger than the upper limit value (13).

In the lower range A, the total shock-absorption requirement increases as the bad-road parameter increases. In this range, a large bad-road parameter indicates short-wave unevenness of the road surface. For example the surface may contain potholes, which do not impart much movement to the vehicle body due to its relatively large mass. However, the axles of the vehicle are underdamped, and this can lead to axle trampling on a bad road. This danger is reduced by the increase in total shock-absorption requirement. This change by itself reduces comfort to some extent, but, on the other hand, it is considered dangerous to allow the axles to trample.

In the medium range B of body shock-absorption requirement, the vehicle body undergoes substantial motions even on a smooth road. It is therefore necessary to reduce the total shock-absorption requirement on a bad road. Otherwise, strong jolts could be felt as the hardened shock absorbers damp the short-wave motions that are characteristic of a bad road. Such jolts can also damage goods that are loaded on the vehicle. Thus both comfort and load security are improved by reducing the total shock-absorption requirement in the medium range. Furthermore, the shock absorbers themselves are stressed less because the shock-absorption task is reduced.

Within the upper range C, the total shock-absorption requirement is not changed from the body shock-absorption requirement. Reducing shock-absorption in this range too much could result in body motions large enough to damage the vehicle structurally. Such damage must be avoided because there is no way to guarantee that the driver could control the vehicle in its altered condition. Thus, because safety has priority, comfort is disregarded in this range.

Figure 3B:
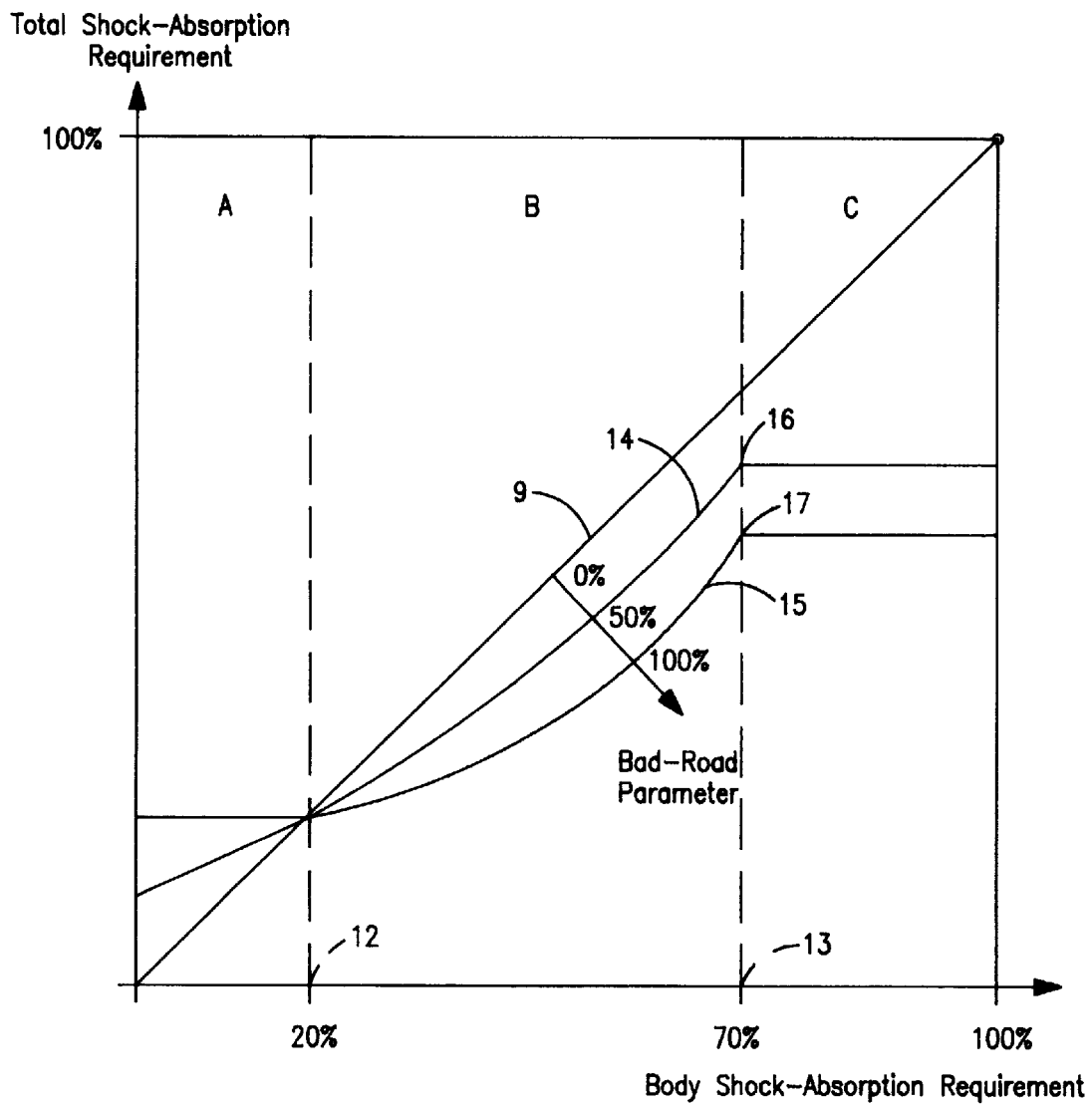
FIG. 3b shows a second type of calculation of the total shock-absorption requirement in FIG. 1 where the reduction is one way in the medium range of body shock absorption and, if reduced, the total shock absorption is fixed in the upper range.

FIG. 3b shows a second way of modifying the body shock-absorption requirement to determine the total shock-absorption requirement for a vehicle traveling on a bad road. The division into three ranges of body shock-absorption requirement and the effects of a bad road in the low range are the same as shown in FIG. 3a. Furthermore, the total shock absorption for a bad-road parameter of 0% is again equal to the body shock-absorption requirement. For these reasons, the same reference numbers (12) and (13) will be used for the lower- and upper-limit values, respectively, of the medium range of body shock-absorption requirement. Furthermore, the same number (9) will be used to label the total shock-absorption requirement when the bad-road parameter is 0%. The effect of a 50% bad-road parameter is indicated by the middle curve (14), and the lower curve (15) shows the effect of a bad-road parameter of 100%.

In its low range, FIG. 3b changes the body-shock absorption requirement by the same amount as FIG. 3a to account for a bad road. In the medium and upper ranges however, a different type of change is provided in FIG. 3b.

In the medium range in FIG. 3b, the reduction in the shock-absorption requirement is similar to the reduction in FIG. 3a while the body shock-absorption requirement is increasing from the lower limit (12) and the reduction itself is increasing. However, the reduction is maintained as the body shock-absorption requirement approaches the upper limit (13). Thus the 50% bad-road curve (14) ends up at a total shock-absorption requirement (16) that is below the upper curve (9) at the upper limit (13) of the medium range. The lower curve (15) for a bad-road parameter of 100% ends up at an even lower value (17) of total shock-absorption requirement at the upper limit (13) of the medium range of body shock-absorption requirement.

As mentioned above, the reduction of the shock-absorption requirement is maintained in the two curves (14, 15) of FIG. 3b when the upper limit value (13) is approached. For example, the curves for bad-road parameters of 50% and 100% go through points (16) and (17), respectively, at the upper limit value (13). In the upper range C, the total shock-absorption requirement is held constant when the bad-road parameter is non-zero. The constant depends on the bad-road parameter such that the total shock-absorption requirement for each bad-road parameter is continuous at the upper limit (13) of the medium range of body shock-absorption requirement. In FIG. 3b, the values (16) and (17) for bad-road parameters of 50% and 100%, respectively, are clearly below the curve for zero bad-road parameter (9).

The total shock-absorption requirement in FIG. 3b for high values of the body shock-absorption requirement (upper portion of the medium range and entire upper range) is lower than in FIG. 3a. This second type of change is also made to reduce the danger that a vehicle traveling on a bad road may sustain damage and become unsafe. The reduction is desirable because a high total shock-absorption requirement could produce shock-absorption forces large enough to damage the shock absorbers or their couplings. This second type of change in body shock-absorption requirement increases both safety and comfort, although the vehicle body will oscillate with larger amplitude.

The inventive suspension system is most effective at maximizing comfort consistent with safety when the shock absorbers admit a fine-grained or continuous adjustment of shock absorption. Nevertheless, the invention can also be applied advantageously with shock absorbers that have a relatively small number of fixed settings. Even when the shock absorbers have only soft, medium, and hard settings, it is still advantageous to take the bad-road parameter into account. For example, on a smooth road, the soft, medium and hard settings could be chosen when the total shock-absorption requirement is less than 20%, between 20% and 70%, and greater than 70%, respectively. Although the variation in settings is limited, an advantageous influence of the bad-road parameter is especially ensured in the medium and higher ranges of body shock-absorption requirement.

While the invention has been described by reference to specific embodiments, this was for purposes of illustration only. Numerous alternative embodiments will be apparent to those skilled in the art and are considered to be within the scope of the invention.

What is claimed is:

1. A vehicle suspension system comprising adjustable air springs and electronically controlled, continuously variable shock absorbers, said suspension system supporting a body on axles of said vehicle, said system adjusting said air springs in response to outputs of sensors which each periodically sense a distance between a point on said body of said vehicle and a corresponding point on one of said axles of said vehicle, wherein said system adjusts each said air spring to maintain said distances at predetermined desired values, each said air spring being connected through a first valve to a compressed air source and through a second valve to an air sink, said system increasing said distance at said air spring by opening said first valve to allow air to enter said air spring from said compressed air source, said system decreasing said distance by bleeding air from said air spring through said second valves to said air sink, wherein said system varies said shock absorbers to a total shock-absorption requirement, wherein said total shock-absorption requirement depends on a body shock-absorption requirement which said system computes from said distances, wherein said total shock-absorption requirement also depends on a body acceleration which depends on second derivatives with respect to time of said distances, wherein said total shock-absorption requirement also depends on changes in said body acceleration with time, wherein said total shock-absorption requirement depends on a bad-road parameter which depends on said body acceleration and said change of said body acceleration evaluation at two or successive times separated by a fixed time increment, wherein said total shock-absorption requirement at each said shock absorber is computed in two or more ranges, wherein said ranges are divided into low, medium and high ranges of said body shock-absorption requirement by a lower limit and an upper limit of said medium range.

2. The vehicle suspension system of claim 1 wherein each said variable shock-absorption requirement exceeds said body shock-absorption requirement in said low range of said body shock-absorption requirement and said total shock-absorption requirement is less than said body shock-absorption requirement in said medium range of said body shock-absorption requirement.

3. The vehicle suspension system of claim 2 wherein said total shock-absorption requirement is equal to said body shock-absorption requirement in said high range of said body shock-absorption requirement.

4. The vehicle suspension system of claim 2 wherein said total shock-absorption requirement is equal to said body shock-absorption requirement in said high range of said body shock-absorption requirement.

5. The vehicle suspension system of claim 4 wherein said total shock-absorption requirement in said high range of said body shock-absorption requirement remains fixed at said total shock-absorption requirement evaluated at said high limit of said medium range.

6. The vehicle suspension system of claim 2 wherein said total shock-absorption requirement differs from said body shock-absorption requirement by an amount which is determined by said bad-road parameter.

7. The vehicle suspension system of claim 1 wherein said medium range lies between limits of said body shock-absorption requirement at 20% and 70%.

* * * * *